United States Patent
Kreppold et al.

(10) Patent No.: US 6,255,984 B1
(45) Date of Patent: Jul. 3, 2001

(54) SENSOR SYSTEM

(75) Inventors: Bernhard Kreppold; Martin Vossiek, both of München; Patric Heide, Neubiberg, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/380,345
(22) PCT Filed: Feb. 26, 1998
(86) PCT No.: PCT/DE98/00571
§ 371 Date: Aug. 30, 1999
§ 102(e) Date: Aug. 30, 1999
(87) PCT Pub. No.: WO98/38525
PCT Pub. Date: Sep. 3, 1998

(30) Foreign Application Priority Data

Feb. 28, 1997 (DE) .............................. 197 08 238

(51) Int. Cl.⁷ ..................................................... G01S 13/34
(52) U.S. Cl. ........................... 342/128; 342/27; 342/120; 342/122; 342/175; 342/195; 342/200
(58) Field of Search .................................. 342/21, 22, 27, 342/28, 118–144, 175, 195, 202, 165, 169, 170–174, 200, 201

(56) References Cited

U.S. PATENT DOCUMENTS

| 4,593,287 | 6/1986 | Nitardy . |
| 5,172,123 | 12/1992 | Johnson . |
| 5,189,427 | * 2/1993 | Stove et al. ........................ 342/128 |

FOREIGN PATENT DOCUMENTS

| 27 10 841 A1 | 9/1977 | (DE) . |
| 0 466 258 A2 | 1/1992 | (EP) . |

* cited by examiner

Primary Examiner—Bernarr E. Gregory
(74) Attorney, Agent, or Firm—Schiff Hardin & Waite

(57) ABSTRACT

FMCW doppler radar, in which a reference signal is generated from the transmit signal via a delay line and a mixer. A measuring signal which is received and mixed with the transmit signal is detected and digitized at the times of the zero crossings of the reference signal. In this way, the measuring signal can be evaluated at time intervals of equal phase of the reference signal. A downstream algorithm enables the generation of a strictly linearly frequency-modulated transmit signal. With this mechanism, phase errors of conventional radar systems are eliminated.

10 Claims, 2 Drawing Sheets

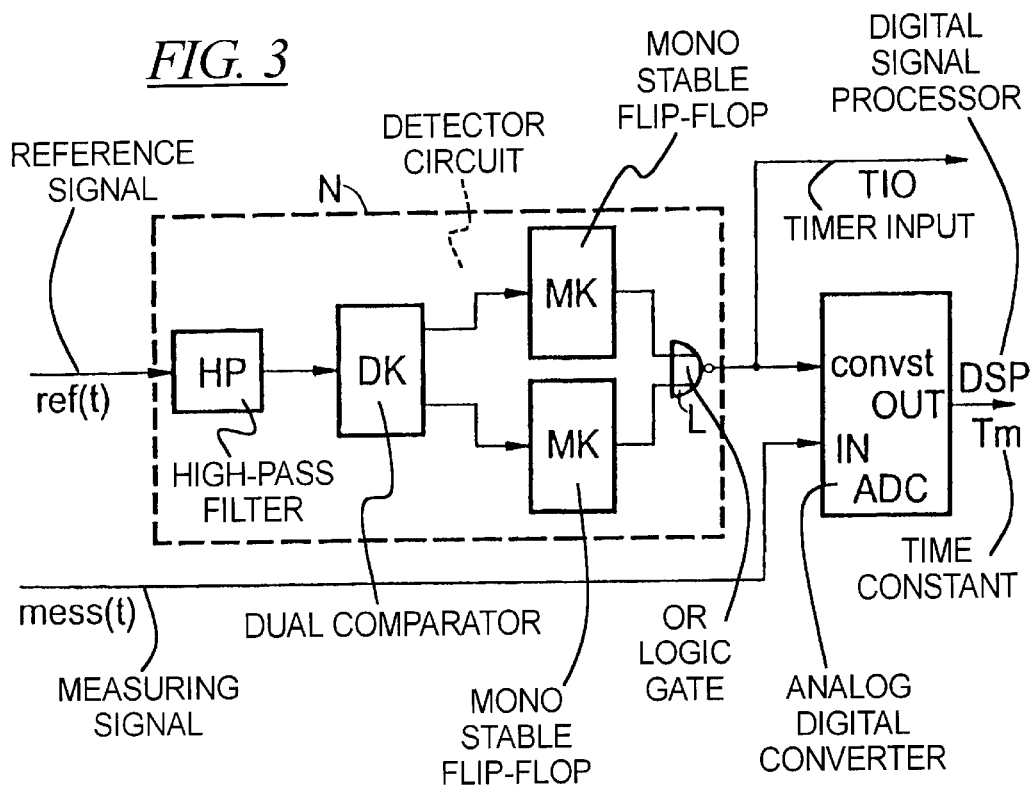
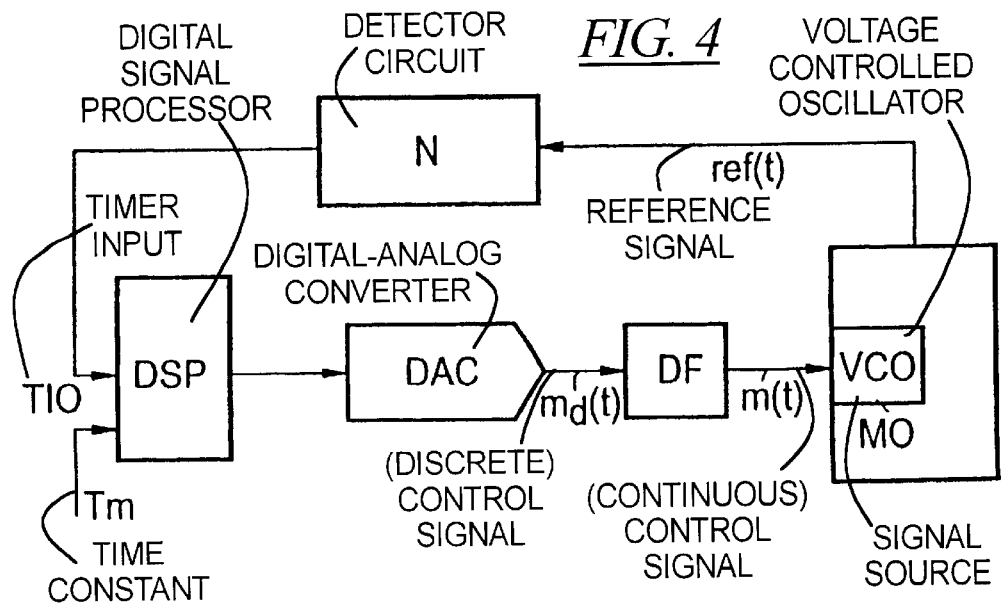

SENSOR SYSTEM

BACKGROUND OF THE INVENTION

1. Field of the Invention

The present invention relates to a sensor system with frequency modulated continuous wave FMCW radar and with a mechanism for correcting phase errors.

In sensor systems with FMCW radar, particularly microwave radar systems, a simultaneous distance and speed measurement is possible. These types of sensor systems have multiple application possibilities, such as in automotive or automation technology. In a sensor of this type, a frequency-modulable signal source (e.g. a microwave oscillator) is present, which emits a linearly frequency-modulated transmit signal via a transceiver (e.g. one or more antennae), for example. The signal, which is received after a delay of the transit time to a measurement subject and back, is separated from the transmit signal as a receive signal by a transceive separating filter and is forwarded to a mixer. In this mixer, the receive signal is demodulated with the transmit signal. A low-pass filtering preferably occurs subsequently, in order to eliminate undesirable frequency portions. In this type of sensor, the information about the distance between the transceiver and the measurement subject is proportional to the phase-angle deviation ( or respectively, the frequency) of the measuring signal. By virtue of this fact, in practice primarily errors of the phase of the signal have a limiting effect on the performance capability (range, measurement accuracy, sensitivity) of the system. For example, as such phase errors, stochastically distributed errors can arise which originate in a phase noise of the signal source. When measurement distances are great, such errors have disadvantageous effects. For example, systematic phase errors are brought about by a non-ideally linearly progressing frequency modulation of the signal source. Errors of this type frequently interfere considerably, even given measurement in the near environment.

2. Description of the Prior Art

In order to suppress these types of phase errors in the described sensors, an appreciable technical outlay is required. DE 27 10 841 A1 teaches an arrangement for measuring distance wherein a linearly frequency-modulated oscillator is used, and mechanisms are provided which correct deviations from the linearity of the modulation with the aid of a delay line and a control loop.

SUMMARY OF THE INVENTION

It is the object of the present invention to propose a sensor system for measuring distance or speed by means of a frequency-modulated signal, where the system can be produced with a relatively low outlay of resources, and has an improved accuracy compared to sensor systems with phase errors.

This object is achieved with the sensor system having a signal source that generates a FM signal, a transceiver, and a mixer that mixes the transceiver signal with the FM signal into a measuring signal. A reference signal is created by mixing a delayed FM signal with the undelayed FM signal, and a detector defines definite phases of the reference signal. Modulation linearization of the signal source is achieved by a measuring signal detector by measuring the signal at the definite phases, and determining a correction from these measurements. Additional embodiments may be envisioned from the following text.

In the inventive sensor system, a reference signal which can be compared to the measuring signal is generated with the aid of an internal delay circuit. At all times at which this reference signal has a definite phase, e.g. a zero crossing, the measuring signal is stored, preferably in digitized form. These values of the measuring signal can then be evaluated regardless of the erroneous fluctuations of the phase caused by the signal source or by other components of the device. The evaluated measurement result thus corresponds to a measurement with a signal medium that is frequency-modulated in an ideally linear manner, for example. In addition to this improved evaluation, the reference signal can be used to carry out a continuous correction of the signal generated by the signal source. The controlling of this correcting mechanism likewise ensues in that the times at which the reference signal has a definite phase are determined, and a respective correction value is calculated by computer from the appertaining phases of the measuring signal. This value is subsequently used to trim the frequency of the signal source.

BRIEF DESCRIPTION OF THE DRAWINGS

A detailed description of the inventive sensor system follows, with reference to the FIGS. 1 to 4.

FIG. 3 is a block circuit diagram for a detector circuit for determining the times of definite phase of the reference signal.

FIG. 4 is a block wiring diagram for an arrangement for correcting the frequency-modulated signal medium that is generated by the signal source.

DESCRIPTION OF THE PREFERRED EMBODIMENTS

Figure 1:
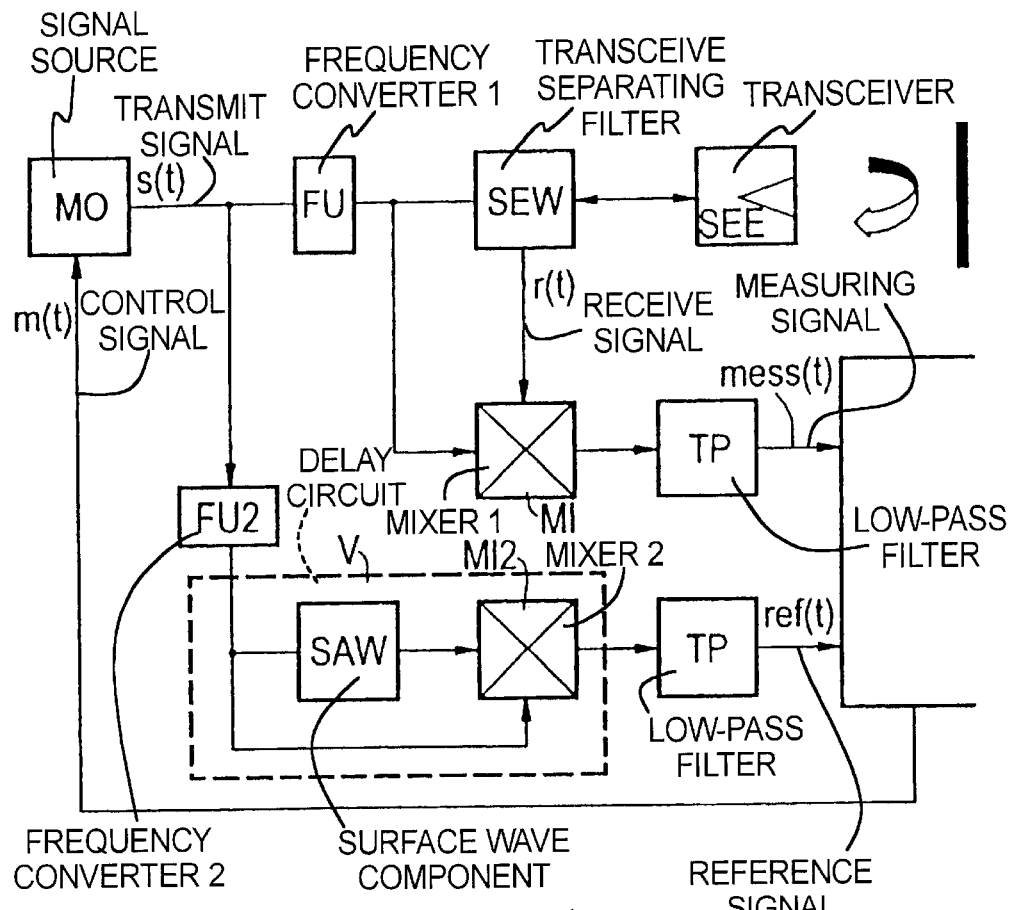
FIG. 1 is a block circuit diagram of an exemplifying embodiment of the overall mechanism.

FIG. 1 depicts the signal source MO, which delivers a signal that propagates in the manner of a wave and that is frequency-modulated. The signal source is a microwave oscillator, a light source or an ultrasound generator, for example. The following describes an exemplary embodiment as a microwave doppler radar. In this case, the signal source has a frequency modulator at its disposal, with which a frequency modulation, preferably a linear modulation, of the microwave signal can be generated. The transmit signal s(t) is fed to a transceive separating filter SEW, which can be a circulator or a directional coupler, for example. From this separating filter, the transmit signal reaches the transceiver SEE, which has one or more antennae at its disposal for purposes of emitting and receiving microwave signals. Once the transmit signal has been emitted and reflected by a measurement subject, it is fed, as a receive signal r(t), from the transceiver to a mixer MI via the transceive separating filter, where the receive signal is mixed with the transmit signal s(t) into the measuring signal mess(t) and is preferably purified of disturbing high-frequency mix portions in a low-pass filter TP.

In the inventive sensor system, a reference signal ref(t) is generated via a delay circuit V. Which delays the transmit signal s(t) coming from the signal source MO, with the aid of a surface wave component SAW, for example. The delayed signal is mixed with the transmit signal s(t) into the reference signal in another mixer MI2 and is preferably conducted through a low-pass filter. In the case of a microwave radar, preferably one surface wave component is used for the time delay of the signal. In other developments of the inventive sensor system, a corresponding alternative delay circuit can be provided. The measuring signal and the reference signal are fed to an additional processing circuit in which the value of the measuring signal at the times of definite phase of the reference signal is determined, potentially digitized, and evaluated.

In addition, FIG. 1 depicts optional frequency converters FU and FU2. The frequency converters FU and FU2 can be constructed as frequency dividers, frequency multipliers or as mixers with a local oscillator. The frequency converter FU serves to convert the voltage controlled oscillator VCO signal s(t) into the desired measuring frequency and bandwidth that the emitted signal should comprise. The frequency converter FU2 serves to convert the voltage controlled oscillator VCO signal s(t) to a frequency and bandwidth that can be transmitted advantageously via the delay means V. In case notable phase errors are caused by the frequency converter FU, it is advantageous to first conduct the signal to the delay circuit (or respectively, to the frequency converter FU2) after the frequency converter FU. These errors can thus be eliminated with the inventive phase error correction.

Figure 2:
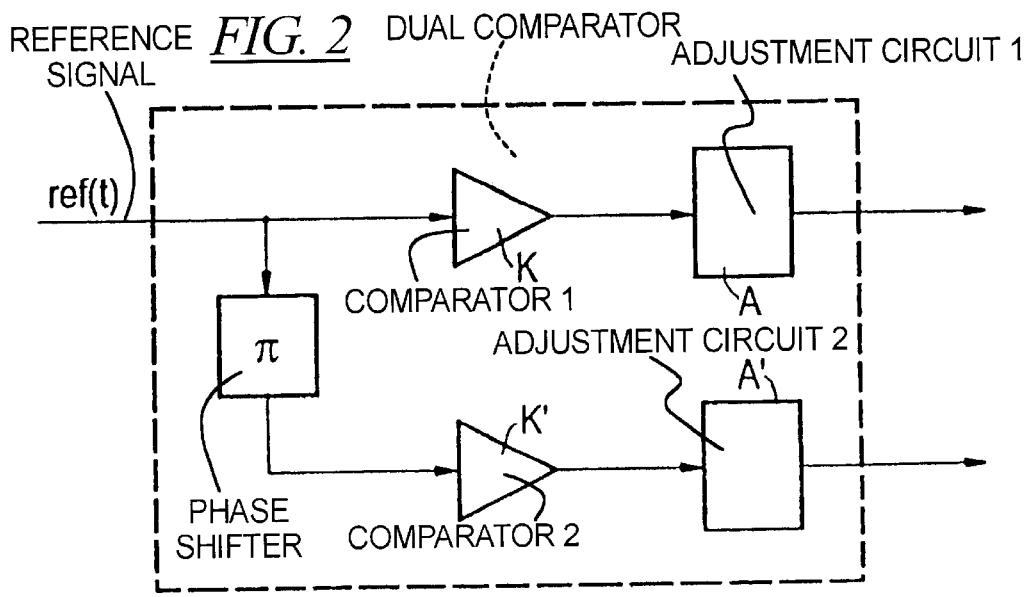
FIG. 2 is a block circuit diagram for a circuit for detennining zero crossings of the reference signal.

Given a direct evaluation of the measuring signal without a correction of the transmit signal, a distortion of the phase characteristic of the transmit signal is subsequently compensated (subsequent equalization) in that the measuring signal is acquired at times of definite phase of the reference signal, and it is thus possible for an evaluation to occur which corresponds to the use of a transmit signal with the ideal phase characteristic. A particularly advantageous wiring realization detects the zero crossings of the reference signal. If a dual comparator according to FIG. 2 is used for this, then zero crossings at which the operational sign of the electrical voltage of the reference signal alternates from the positive range into the negative range or vice versa can be detected in like manner. In this circuit arrangement, the reference signal is fed on one hand to a comparator K and on the other hand to a second comparator K' via a phase shifter $\pi$, which shifts the phase of the signal 180°. It is then possible, for measurement accuracy, to have an adjustment A of the voltage level and a conforming of the circuit branch for purposes of improving the symmetry. To guarantee a high circuit symmetry, it is advantageous to use a dual comparator with two comparators that are integrated on one chip in a monolithic manner. This guarantees thermal coupling and low tolerances of the individual components. The two separate signals are fed to integrated monostable flip-flops (monoflops) prior to their merging, for purposes of pulse shaping. Alternatively, a relatively simpler differentiating circuit can be used.

FIG. 3 depicts the detector circuit that is provided for purposes of determining definite phases of the reference signals, here the zero crossings, in particular. The reference signal is first fed to a high-pass filter HP in order to suppress possible direct-voltage portions or low-frequency noise signals. The dual comparator DK according to FIG. 2 and the monostable flip-flops MK as well as an OR logic gate L follow. The resulting output signal of this detector circuit N then serves to detect the times or time intervals of the definite phases (e.g. by way of a clock counter that is controlled by the output signals of the detector means) and to feed them to an evaluation. The output signal of the detector means can be used as a trigger signal for controlling an analog-digital converter ADC, for example. The measuring signal mess(t) is applied at an input of this analog-digital converter ADC and is converted into digital signals in the cycle of the output signal which is delivered by the detector way N. The measuring signal is thus sampled at the times of identical phase of the reference signal. The thus obtained discrete sample values of the measuring signal are stored in the memory of a downstream evaluating computer where they can be further processed by the computer for purposes of determining the distance or the speed of the measurement subject.

With the arrangement according to FIG. 1, a control signal m(t) can also be generated which permits a correction (pre-equalization) of the transmit signal generated by the signal source. According to FIG. 1, the reference signal arises due to the mixing of the transmit signal s(t) with the signal which is delayed by the delay line (surface wave component SAW) by a defined delay time. Given an ideal microwave signal without phase error, the resulting reference signal is monofrequent, whereby the frequency is proportional to this delay time. This frequency can be determined from the time intervals of the zero crossings. To achieve this in accordance with FIG. 4, the output signal of the detector circuit N is conducted to a timer input TIO, of a digital signal processor DSP. With each trigger impulse of a zero crossing, detected by the detector means, of the reference signal the trigger means of the digital signal processor is actuated. A clock counter of the digital signal processor is activated and deactivated via these trigger impulses, it being possible to determine the time interval between two trigger signals via the number of time cycles counted between two trigger impulses. Given a linear frequency modulation of the transmit signal, the time interval $T_{zero}$ between two zero crossings of the reference signal is constant, and the slope of the time-frequency curve is inversely proportional to $T_{zero}$. The linearization of the frequency modulation can thus be guaranteed in that the signal source is trimmed in frequency such that these time intervals between two zero crossings of the reference signal remain constant.

If the measured time between two zero crossings of the reference signal is greater (less) than the expected time (defined by sweep rate and dimensioning of the delay line), then the slope of the time-frequency curve and thus the characteristic of the modulation must be increased (decreased) in the subsequent sweep (passing of the modulation through the frequencies from the lowest to the highest, or vice versa). It is appropriate to correct more, the greater deviations. An adapted modulation characteristic for the next respective sweep is gradually generated in this way. To enable a first error calculation, a linear modulation signal (triangular voltage) is applied at the oscillator prior to the start of a provided iteration procedure. The first measurement of the difference between the target and real values of the intervals between the zero crossings is thus carried out. The result is stored as $\Delta T_{zero}^{(0)}(t)$. The modulation signal, which is stored in a digitized form, is always corrected anew via an iteration procedure. The control signal m(t) is first output by the digital-analog converter DAC as a function of discrete voltage values depending on discrete time values.

In the conventional description, the control voltage as a function of time has the following form:

$M_d(t) = \Sigma_n M(nT_m) \cdot h_0(T-nT_M)$, whereby $h_0(t) = A_m$ for $0 \leq t < T_m$; and otherwise $h_0(t) = 0$; $T_m$ is a separate time constant which is independent of the analog-digital sampling;

$A_m$ is a scaling constant, such as $A_m = 1$.

The modified $m_d^{(\mu+1)}(t)$ for the $(\mu+1)$-th iteration step is formed from $m_d^{(\mu)}(t)$ of the $\mu$-th iteration step and from a correcting summand $k^{(\mu)}(t)$. The following equatroin then applies: $m_d^{(\mu+1)}(t) = m_d^{(82)}(t) + k^{(\mu)}(t) \; k^{(82)}(t) = \text{const} \cdot \Delta T_{zero}^{(\mu)}(t)$. The "const" can be optimized for the given example of application within the limits in which the iteration can be carried out: High values for these constants shorten the processing time required for the pre-equalization but exert a negative effect due to large modification steps, since the corrections may not lead to the desired value with sufficient uniformity. On the other hand, low values of the constants effect a precise linearization but delay the process considerably. A compromise must thus be made which fits the specific instance of application. It is advantageous to couple the selection of the constants to the size of the deviation from the linearity of the modulation. Beyond this, the constants should be selected such that stochastic phase errors, which cannot be compensated by pre-equalzing, are averaged out. The systematic phase errors are then optimally corrected by the evaluation. It is also possible to compute the corrected signal directly, as opposed to adaptively from the times of the definite phases of at least one detected reference signal. The frequency of the transmit signal results from the detected time intervals between two definite phases. The voltage is known, since the inventive system itself calculates and outputs the modulation signal. Given the presence of stochastic phase errors, a plurality of reference signals should be evaluated, in order to determine an averaged (systematic) relation between the modulation voltage and the transmit frequency.

The desampling filter DF illustrated in FIG. 4 has a smoothing effect, so that the continuous control signal m(t) arises from $m_d(t)$. If the interval of the zero crossings of the reference signal is too large, the correction factor k(t) is positive, so that the control signal m(t) is enlarged by the correction. This effects an increase of the frequency of the reference signal, so that the time interval of two zero crossings becomes smaller in the next iteration step. The iteration procedure is run through until all deviations of the time intervals of two zero crossings of the reference signal from the desired time-span is below a predefined barrier in terms of value. This barrier is determined by the selection of the processing time and measuring accuracy.

The required computing time can be further reduced if the algorithm for the linearization is applied to only half the modulation curves, which are symmetrical for doppler measurements. Once the required accuracy is achieved, the pre-equalized curve branch for the upsweep (varying of frequency in the upward direction) is stored in the subsequent memory area vertically reflected. The now completed pre-equalization finally isolates the subsequent signal evaluation; further unnecessary linearization cycles are suppressed. A sequential processing of the pre-equalization and the remaining signal processing are thus achieved, which carries several advantages. Allegedly false measurements with an as yet incompletely pre-equalized modulation curve are avoided. The deactivation of the linearizing iteration releases additional reserves for computing power. Given drift due to aging or temperature, the linearizing can be reactivated as needed (e.g. given the detection of a large non-linearity).

We claim as my invention:

1. A sensor system comprising:
   a signal source that generates a frequency-modulated (FM) signal that propagates in the manner of a wave,
   a transceiver and a mixer, wherein said mixer mixes a signal coming from said transceiver with said FM signal, into a measuring signal,
   a delay circuit, which chronologically delays said FM signal and mixes it with said FM signal, for purposes of generating a reference signal,
   a detector circuit, which defines definite phases of said reference signal and which comprises two comparators which are arranged so that one comparator can be actuated with said reference signal, and the other comparator can be actuated with said reference signal shifted 180° in phase, and
   a measuring signal detector circuit for detecting said measuring signal at the instants of said definite phases and which determine a correction therefrom, with which said correction the modulation of said signal source is linearized.

2. The sensor system according to claim 1, wherein outputs of said comparators are conducted to monostable flip-flops (monoflops).

3. The sensor system according to claim 1, wherein said outputs of said comparators are conducted to a differentiator.

4. The sensor system according to claim 1
   wherein said signal source is configured to deliver a linearly frequency-modulated signal.

5. The sensor system according to claim 1 comprising:
   an evaluation circuit with a clock counter which is controlled by an output signal of detector circuit, wherein said evaluation circuit is so arranged and of such a nature that it calculates a correction signal from values delivered by said clock counter, wherein said correction signal is fed to said signal source, and
   a frequency trimming circuit which trims the frequency of said FM signal such that the absolute value of said correction signal remains below a predefined limit.

6. The sensor system according to claim 5, wherein said evaluation circuit can generate a modulation which is mirrored with respect thereto for stored values of a modulation.

7. The sensor system according to claim 5, wherein
   said evaluation circuit comprises a digital signal processor, and
   said sensor system comprises a digital-analog converter, which converts a digitally computed correction signal into an analog correction signal.

8. The sensor system according to claim 1, wherein
   said delay circuit comprises a surface wave component and an additional mixer, wherein
   said additional mixer is so arranged as to be able to mix, into reference signal, a signal coming from said surface wave component and said FM signal.

9. The sensor system according to claim 1 comprising:
   an analog-digital converter that has a trigger,
   an arrangement comprising said detector circuit and said analog-digital converter,
   wherein said arrangement produces an output signal from said detector circuit which controls said trigger, and
   said analog-digital converter converts said measuring signal to a digital output signal in cycle with said detector circuit control, and
   an evaluation circuit allowing an evaluation of said measuring signal from said output signal.

10. The sensor system according to claim 9 wherein said evaluation circuit allows a correction of a signal medium delivered by said signal source.

* * * * *